United States Patent [19]

Mobley

[11] Patent Number: 4,567,517
[45] Date of Patent: Jan. 28, 1986

[54] DESCRAMBLER FOR SYNC-SUPPRESSED TV SIGNALS

[75] Inventor: Joseph G. Mobley, Dunwoody, Ga.

[73] Assignee: Scientific-Atlanta, Inc., Atlanta, Ga.

[21] Appl. No.: 466,699

[22] Filed: Feb. 15, 1983

[51] Int. Cl.[4] .......................... H04N 7/16; H04B 1/04
[52] U.S. Cl. ................................................... 358/120
[58] Field of Search ............... 358/120, 123, 124, 118; 307/350, 358; 329/109, 146; 328/146; 375/76, 113

[56] References Cited

U.S. PATENT DOCUMENTS

| | | | |
|---|---|---|---|
| 3,530,232 | 9/1970 | Reiter et al. | 358/120 |
| 3,813,482 | 5/1974 | Blonder | 358/120 |
| 4,163,252 | 7/1979 | Mistry et al. | 358/118 |
| 4,241,309 | 12/1980 | Elder | 307/358 |
| 4,458,268 | 7/1984 | Ciciora | 358/120 |

*Primary Examiner*—S. C. Buczinski
*Assistant Examiner*—Linda J. Wallace
*Attorney, Agent, or Firm*—M. LuKacher

[57] ABSTRACT

Suppressed sync TV signals are descrambled by restoring their sync intervals with restoring pulses generated in predetermined time relationship with timing pulses which are transmitted with the TV signals, amplitude modulated on the audio carrier (the center of the sound or audio frequency portion of the TV signal). The timing pulses are derived by intercarrier demodulation of the television signals which are transmitted on a RF (radio frequency) channel so as to avoid loss of the timing pulses in the event of deviation of the RF TV signals in frequency, either on transmission or due to frequency errors in an up/down converter which is tuned to select the RF TV channel. Baseband signals containing the audio portion of the TV signals are envelope detected in a manner to discriminate against changes in the average level of the sound carrier envelope due, for example, to variations between the sound and picture carrier components of the transmitted TV signal, as by a comparator which responds to the difference between the average value of the envelope and the pulses superimposed upon the envelope attenuated 6 dB such that the timing pulses are detected when they reach fifty percent of peak amplitude.

16 Claims, 4 Drawing Figures

DESCRAMBLER FOR SYNC-SUPPRESSED TV SIGNALS

DESCRIPTION

The present invention relates to descramblers for TV signals which are scrambled by the suppression of their sync intervals and which are transmitted with timing pulses having predetermined time relationship with the sync intervals for timing the restoration of the sync pulses during the sync intervals.

The invention is especially suitable for use in scrambling systems in which the timing pulses are transmitted in the audio frequency portion of the TV signals by amplitude modulation of a carrier; for example the audio carrier, which is at the audio or sound center frequency.

The invention is principally applicable for use in cable TV systems where premium programs are transmitted in suppressed sync, scrambled format. The invention may also be used where premium programs are transmitted with sync suppressed scrambling by broadcast over the air or over other transmission systems as in hotels, dormitories and other places of accommodation.

In the typical cable system the TV signals are transmitted in a multiplicity of radio frequency (RF) channels, multiplexed on the cable. An up/down converter is provided to each subscriber which is tunable to select any desired RF TV channel. Conventionally, the timing signals are detected by a trap or filter which passes the audio portion of the TV signal. The audio portion is then amplitude demodulated to detect the timing pulses. Sometimes the frequency of the RF signals shifts, due, for example, to frequency errors in the multiplexing process at the head end of the cable system or in the up/down converter. Since the timing pulses are detected on a frequency selective basis, such frequency errors and shifts can result in the loss of the timing pulses. The descrambler is then inoperative to restore the sync to the TV signal. The signal is therefore not descrambled as desired and is unacceptable to the subscriber. The problem is sometimes further exacerbated by amplitude variations in the audio portion of the TV signal. Since the pulses are amplitude modulated and detected on the basis of their amplitude, for example, on the slope of the leading edge of the pulse which carries the timing information, the pulses may be detected with timing errors due to such amplitude variations, and even may be lost. As a consequence of such amplitude variations, the descrambler does not operate satisfactorily and the subscriber is not provided with a TV picture of the requisite quality.

It is therefore an object of the present invention to provide an improved descrambler for sync suppressed TV signals having immunity to frequency variations in the TV signals applied thereto.

It is another object of the present invention to provide an improved descrambler for sync suppressed TV signals transmitted with timing pulses modulated on the audio portion of the TV signals having immunity to variations in the amplitude or level of the timing pulses.

It is a further object of the present invention to provide an improved descrambler for sync suppressed TV signals having timing pulses modulated thereon wherein the timing pulses can be readily and reliably detected regardless of shifts in frequency of the TV signals and variations in the amplitude thereof which can affect the amplitude of the timing signals.

Briefly described, a descrambler for a suppressed sync TV signal, transmitted with timing signals modulated thereon on an RF TV channel and which embodies the inventions, utilizes means for intercarrier demodulation of the associated sound carrier to produce a hetrodyned sound carrier at 4.5 MHz (a baseband signal). The descrambler also has means for detecting the timing pulses placed on the sound carrier as well as means responsive to the timing pulses for restoring the suppressed sync in the TV signal, thereby descrambling the signal. The detection of the timing pulses is carried out by means which tracks variations in the envelope level of the detected baseband signal as may result from changes in the ratio of the sound to picture carriers which affects the amplitude of the audio portion of the baseband signal. These variations are compensated for in the detection of the timing pulses so as to recover the timing pulses without timing errors resulting from such amplitude variations.

The foregoing and other objects, features and advantages of the invention, as well as a presently preferred embodiment thereof, will become more apparent from a reading of the following description in connection with the accompanying drawings in which:

FIG. 1a is the response of the filter in the intercarrier demodulator shown in FIG. 1;

Figure 1:
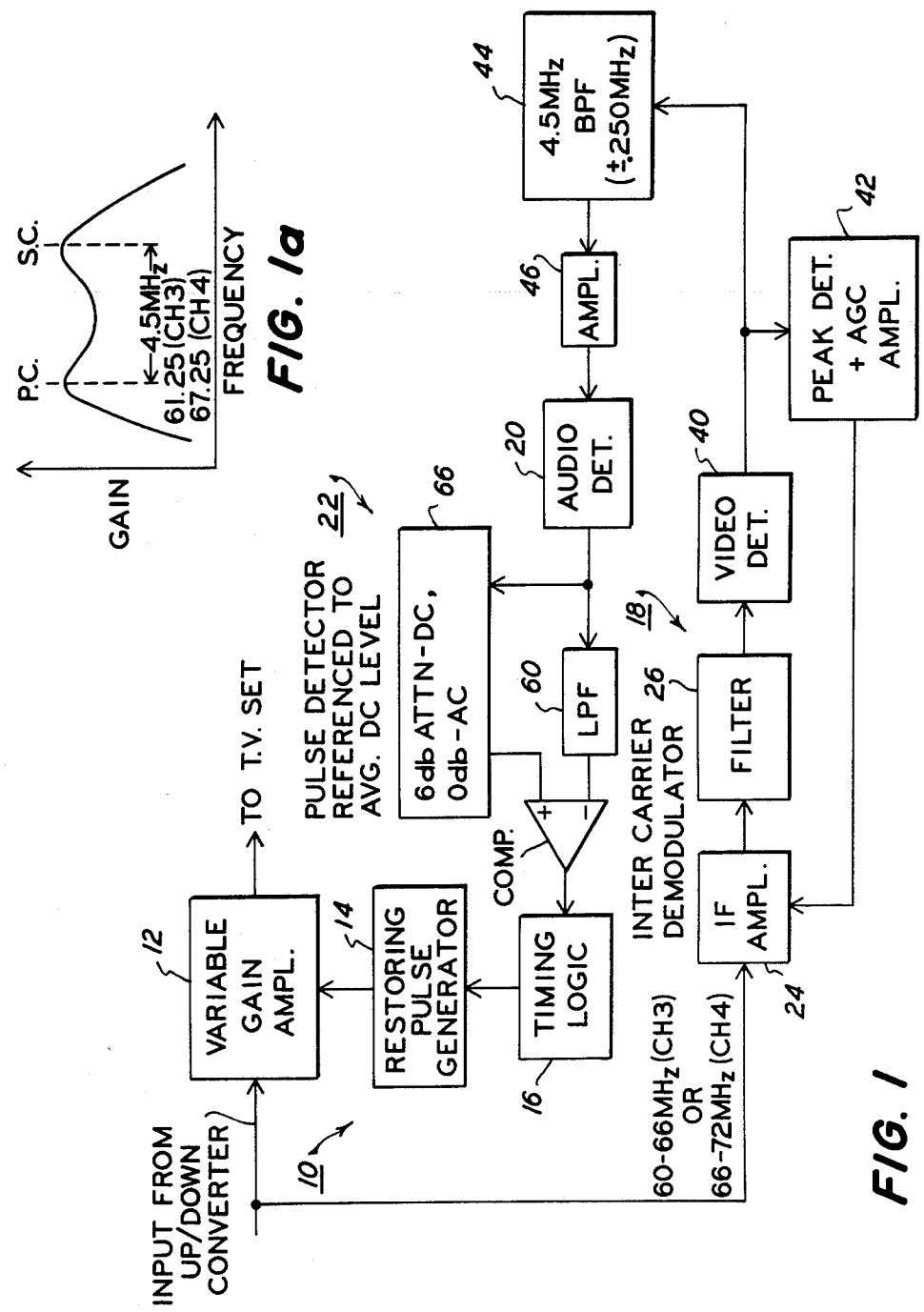
FIG. 1 is a block diagram of a descrambler which embodies the invention.

Referring first to FIG. 1, there is shown a descrambler 10 which is connected between the up/down converter and the antenna terminals of the subscriber's TV set. The subscriber, by tuning the converter, selects the desired channel and converts its frequency to an authorized radio frequency channel, either channel 3 or channel 4, depending upon which is not used in the subscriber's area. Channel 3 covers 60 to 66 MHz, while channel 4 covers 66 to 72 MHz. The RF TV signal, when scrambled, is transmitted with the sync intervals thereof suppressed. Also transmitted as amplitude modulation of the associated sound carrier frequency (5.75 MHz above the lower end of the channel) are timing pulses. A timing pulse is transmitted during each horizontal line. The timing pulses may also be transmitted with delay control pulses or other pulses which provide encryption information also modulated at different times than the timing pulses on the sound carrier frequency. The invention is also operative to detect these delay control or other pulses. The invention will be understood from the case where only timing pulses are transmitted, amplitude modulated on the sound center frequency or carrier.

The timing pulses are transmitted in predetermined time relationship with the cync intervals. This time relationship may be dynamically variable. A scrambling system wherein the time relationship between the timing pulses and the sync intervals is dynamically varied is described in U.S. Pat. No. 4,466,017, issued Aug. 14, 1984 to Robert O. Banker.

In the descrambler 10, a variable gain amplifier 12 is provided in the path between the up/down converter and the TV set. A variable attenuator may alternatively be used. The gain presented by the amplifier 12 is increased to restore the sync pulses and descramble the signal during the interval of a restoring pulse generated by a restoring pulse generator 14. The restoring pulse generator is timed by the timing pulses and the appropriate delay as inserted by timing logic 16. This timing logic may include counters which count clock pulses before generating the appropriate time delays under control of the timing pulses. Of course, analog delay circuits, such as one shots, may be used. The above referenced Banker Patent describes appropriate timing circuits when the timing is dynamically varied.

The RF TV signal is demodulated in order to derive the timing pulses. An intercarrier demodulator 18 is used together with an audio, envelope detector 20 and a pulse detector 22 to extract the timing pulses, even though the RF frequency of the sound carrier may shift or the amplitude of the TV signal, including the sound carrier, may vary. The intercarrier demodulator 18 has an intermediate frequency amplifier 24, the input of which is AC coupled to the descrambler input from the up/down converter. An IF amplifier, which is commercially available in integrated circuit form (suitable, for example, is the type 1350 which is sold by Motorola Semiconductor Products of Phoenix, Ariz.). The output of the IF amplifier is tuned either to channel 3 or channel 4 depending on the available channel in the subscriber's area. A band pass filter 26 at the output of the IF amplifier has a response characteristic, generally indicated in FIG. 1a, which emphasizes the picture carrier (P.C.) and audio sound carrier (S.C.) frequencies.

Figure 2:
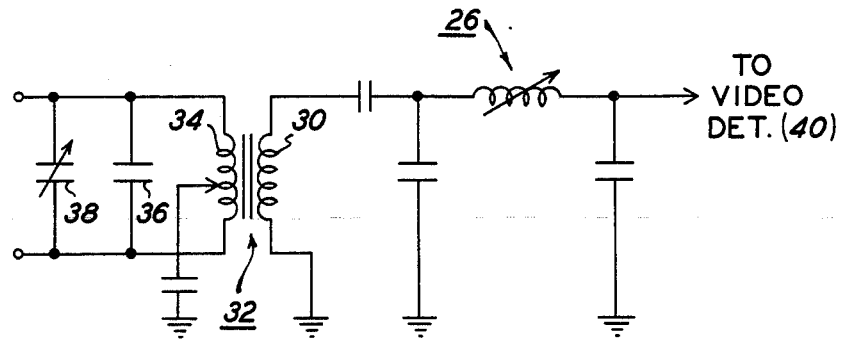
FIG. 2 is a schematic diagram of the filter in the intercarrier demodulator of the system shown in FIG. 1.

FIG. 2 shows this filter 26 in greater detail. The filter 26 tunes the secondary 30 of an IF transformer 32. The primary 34 of the IF transformer is connected to the output of the IF amplifier 24 and is tuned by capacitors 36 and 38 which are connected in parallel therewith. The filter 26 is a double tuned pi filer which has poles at the picture and audio carrier frequencies and emphasizes these frequencies.

The output of the filter 26 is applied to a video detector 40 which mixes the RF TV signal plus sound carrier with the picture carrier to translate the RF signal into a baseband video signal. Where the channel 3 RF TV signal is used, and the picture carrier is at 61.25 MHz the sound carrier will be translated to 4.5 MHz. Even where the RF frequency shifts, the picture and sound carriers will shift correspondingly and the demodulated output, including the sound carrier, will be at the same baseband frequency; the demodulated sound carrier frequency being centered at 4.5 MHz. The video detector may suitably be implemented through the use of a commercially available integrated circuit, such as the 1330, which is sold by Motorola Semiconductor Products. The output of the video detector 40 may be peak detected and amplified to provide an automatic gain control signal to the IF amplifier 24. A peak detector and AGC amplifier circuit 42 may be used for this purpose. The AGC signal then follows the peaks of the picture carrier. Nevertheless, the ratio of the audio to picture carrier amplitudes may vary depending upon the characteristics of the transmission channel (the cable), the amplitudes of the signals transmitted from the head end by the cable operator, environmental and other factors. These variations affect the amplitude of the demodulated sound carrier and as a result, the amplitude of the timing pulses. These amplitude variations are compensated for and accommodated by the pulse detector 22.

Figure 3:
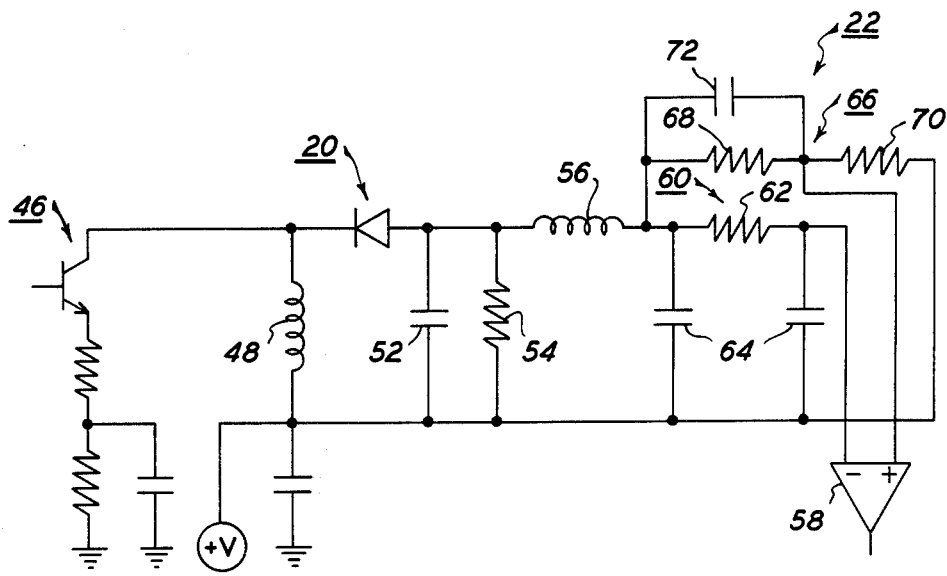
FIG. 3 is a schematic diagram of the pulse detector of the system shown in FIG. 1.

Before being applied to the pulse detector 22, the baseband signal is filtered in a 4.5 MHz band pass filter 44 which may have a pass band of ±250 KHz centered at the 4.5 MHz sound carrier frequency. An amplifier 46 applies the sound signal from the filter 44 to the audio carrier envelope detector 20. FIG. 3 shows the collector emitter circuit of the amplifier 46. Operating voltage for the amplifier is applied from a supply at +V through a choke 48 which also decouples the supply from the amplifier for the 4.5 MHz sound frequencies. The audio detector 20 is provided by a diode 50 and a capacitor 52 shunted by a resistor 54 so as to provide an output which follows the envelope of the sound frequencies passed by the filter 44. An inductor 56 is also part of the filter for the envelope detector 20. The pulse detector 22 includes a comparator 58 which may be provided by a difference amplifier having direct (+) and inverting (−) inputs. Also included in the pulse detector 22 is a low pass filter (LPF) 60 which has a 3 dB cut off frequency (low enough to provide a signal representing the average value of the envelope while extracting the pulse waveform). This filter may be provided by a series resistor 62 and shunt capacitors 64, as shown in FIG. 3. A high pass network 66 in the detector 22 provides attenuator for low frequencies (at D C) which does not attenuate higher frequency components and therefore passes the timing pulses at full amplitude. This network 66 provides one input from the pulse detector to the comparator while the low pass filter 60 provides the other or reference input to the comparator.

The network 66 obtains the attenuation of low frequency signals by a voltage divider having two resistors 68 and 70. The resistors are connected across the output of the detector 20. One of these resistors 68 is shunted by a capacitor 72 which may, for example, be relatively large (e.g., 0.1 microfarad). The resistor 68 is approximately half the value of the resistor 70. For example, a resistor 68 may be 2.4 Kohms while the resistor 70 is 5.6 Kohms. These values are chosen so that the DC component of the envelope provided at the output of the detector 20 is attenuated 50 percent or 6 dB. Accordingly, the timing pulse is applied to one input of the comparator (the direct input) at substantially 0 dB attenuation, while the envelope insofar as its lower frequency components are concerned are applied to both inputs, and with 50 percent attenuation to the direct input. Fifty percent of the average level of the envelope thus serves as a threshold level in the comparator 58. Inasmuch as the timing pulses are superimposed upon this average value and vary therewith, the comparator 58 will conduct to provide a step in its output level (for example, the output of the comparator may go low) when the timing pulse is fifty percent of its peak value. The timing of the fifty percent point is substantially invariant with level changes in the TV signal and especially the sound carrier frequency thereof because the comparator works on the ratio of the amplitudes of the signals applied to its input. The output of the comparator 58 is therefore a pulse equal in duration to the timing pulse between its fifty percent of peak amplitude points. This output pulse is used in the timing logic 16 to time the generation of the restoring pulse in the restoring pulse generator 14. The restoring pulse operates the variable gain amplifier 12 to raise the amplitude of the sync pulses to their proper amplitude so that the picture produced by the TV set will stay locked and in sync.

From the foregoing description it will be apparent that there has been provided an improved descrambler for sync suppressed TV signals. A presently preferred embodiment of the descrambler has been described to illustrate the invention. Variations and modifications of the herein described descrambler, in accordance with the invention, will undoubtedly suggest themselves to those skilled in the art. Accordingly, the foregoing description should be taken as illustrative and not in a limiting sense.

I claim:

1. A descrambler for a sync suppressed TV signal having a picture carrier and a sound signal carrier which is transmitted with timing pulses as amplitude modulation of said sound signal, which comprises means operating upon said TV signal when it is above its baseband frequency range for intercarrier demodulating said sound carrier against said picture carrier to produce a video baseband signal, including said sound signal, means for detecting said timing pulses in said baseband sound signal, said detecting means including means for amplitude demodulating said sound signal to produce a signal representing the envelope thereof and translating said envelope into first and second signals wherein said pulses are present and absent respectively, and means for outputting said timing pulses when said first signal is a predetermined ratio of said second signal, and means responsive to said detected timing pulses for restoring said sync pulses in said TV signal thereby descrambling said TV signal.

2. The descrambler according to claim 1, wherein said intercarrier demodulating means includes filter means for emphasizing components of said TV signal carrying the picture carrier and sound signal carrier of said TV signal to provide an output, and video detector means responsive to said output for providing said video baseband signal including said sound signal.

3. The descrambler according to claim 2 further comprising filter means for deriving the portion of said baseband signal containing said sound signal, and said amplitude demodulating means including an amplitude modulation detector to which said sound signal portion of said baseband signal is applied.

4. The descrambler according to claim 3, wherein said video detector means includes means for mixing said picture carrier with said TV signal at RF frequencies to provide said video baseband signal.

5. The descrambler according to claim 1 wherein said translating means of said detecting means comprises means for providing the average level of the envelope as said second signal, said outputting means comprises means responsive to the difference between said first and said second signals for deriving said timing pulses from said envelope.

6. The descrambler according to claim 5 wherein said envelope detecting means includes a peak detector with a filter.

7. The descrambler according to claim 5 wherein said difference responsive means includes comparator means having two inputs and an output at which said detected timing pulses are provided, means responsive to said envelope for applying only relatively low frequency components thereof to one of said inputs as said second signal, and a larger portion of the higher than low frequency components of said envelope to the other of said inputs as said first signal.

8. The descrambler according to claim 7 further comprising means for applying said envelope attenuated except for higher frequency components including said timing pulses to said other input of said comparator.

9. The descrambler according to claim 8 wherein said applying means provides attenuation about 6 dB to said envelope without attenuating said timing pulses whereby said comparator detects said timing pulses when said timing pulses reach approximately fifty percent of their peak amplitudes.

10. The descrambler according to claim 8 wherein said applying means comprises a low pass filter for applying said envelope to said one input of said comparator and a high pass filter for applying said envelope to said other input of said comparator.

11. The descrambler according to claim 10 wherein said amplitude demodulating means includes a detector and filter, said high pass filter comprises a pair of resistors having their resistance in the ratio of approximately 1 to 2 defining a divider, the lower value one of said resistors being connected to said detector filter and being shunted by a capacitor having a capacitance sufficient to pass said timing pulses without substantial attenuation, and the junction of said resistors being connected to the other input of said comparator.

12. The descrambler according to claim 1 wherein said timing pulses amplitude modulate the sound carrier of said TV signal, and said above baseband intercarrier demodulating means comprises a video detector which produces said video baseband signal including said sound signal with a 4.5 MHz sound carrier amplitude modulated with said timing pulses.

13. The descrambler according to claim 1 wherein said amplitude demodulating means includes an audio detector which provides said amplitude representing signal, first circuit means responsive to said envelope representing signal for providing a reference signal from said envelope representing signal as said second signal, and second circuit means for providing a signal which follows the amplitude variations in said envelope representing said timing pulses as said second signal, and said outputting includes means responsive to the difference between said first and said second signals.

14. The descrambler according to claim 1 wherein said means for operating said outputting means so that said timing pulses are detected when said first signal is a predetermined ratio of said second signal includes means for attenuating at least one of said first and said second signals before application thereof to said difference responsive means.

15. A method for descrambing a sync suppressed TV signal having a picture carrier and a sound signal carrier having timing pulses amplitude modulated thereon, said method comprising the steps of:

intercarrier demodulating the sound carrier against the picture carrier when the TV signal is above its baseband frequency to produce a video baseband signal including the sound signal;

amplitude demodulating the sound carrier to produce a signal representing its envelope;

translating the envelope into first and second signals wherein the timing pulses are present and absent respectively;

outputting the timing pulses when the first signal has a predetermined relationship to the second signal; and inserting a sync pulse into the TV signal corresponding to each said timing pulse outputted in the previous step.

16. The method of claim 15 wherein said outputting step includes the sequential steps of:

attenuating at least one of the first and the second signals; and determining the difference in amplitude of the signals resulting from the previous step.

* * * * *